(12) United States Patent
Toichi

(10) Patent No.: US 9,973,644 B2
(45) Date of Patent: May 15, 2018

(54) IMAGE PICKUP APPARATUS WITH FORCED AIR-COOLING STRUCTURE

(71) Applicant: CANON KABUSHIKI KAISHA, Tokyo (JP)

(72) Inventor: Hideki Toichi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/382,106

(22) Filed: Dec. 16, 2016

(65) Prior Publication Data

US 2017/0187906 A1    Jun. 29, 2017

(30) Foreign Application Priority Data

Dec. 25, 2015 (JP) .................................. 2015-254085

(51) Int. Cl.
*H04N 5/68* (2006.01)
*H04N 1/00* (2006.01)
*H04N 5/225* (2006.01)

(52) U.S. Cl.
CPC ....... *H04N 1/00984* (2013.01); *H04N 5/2251* (2013.01); *H04N 2201/0084* (2013.01)

(58) Field of Classification Search
CPC ................................................. H04N 1/00984
See application file for complete search history.

(56) References Cited

U.S. PATENT DOCUMENTS

| 6,316,908 | B2 * | 11/2001 | Kajiura | B60L 11/1825 320/104 |
|---|---|---|---|---|
| 7,830,660 | B2 * | 11/2010 | Kang | G02F 1/133385 165/185 |
| 9,232,171 | B2 * | 1/2016 | Sugiura | H04N 5/64 |
| 2005/0084252 | A1 * | 4/2005 | Satou | G11B 17/0405 386/230 |
| 2007/0024743 | A1 * | 2/2007 | Hida | G08B 13/19619 348/373 |
| 2009/0002549 | A1 * | 1/2009 | Kobayashi | H04N 5/2251 348/374 |
| 2014/0184835 | A1 * | 7/2014 | Nozawa | H04N 5/23261 348/208.3 |
| 2016/0301819 | A1 * | 10/2016 | Petty | H04N 1/00981 |

FOREIGN PATENT DOCUMENTS

JP        2009-151037 A     7/2009

* cited by examiner

*Primary Examiner* — Gary C Vieaux
(74) *Attorney, Agent, or Firm* — Cowan, Liebowitz & Latman, P.C.

(57) ABSTRACT

An image pickup apparatus with forced air-cooling structure, which is capable of improving heat radiating efficiency. The image pickup apparatus comprises a fan, an inlet, an outlet, and a duct, which has an inhaling part interconnecting with the inlet, a discharging part interconnecting with the outlet, and a cooling part connected to each of the inhaling part and the discharging part. Each of the inhaling part and the discharging part is connected to the cooling part in a direction intersecting with the cooling part.

8 Claims, 26 Drawing Sheets

IMAGE PICKUP APPARATUS WITH FORCED AIR-COOLING STRUCTURE

BACKGROUND OF THE INVENTION

Field of the Invention

The present invention relates to an image pickup apparatus, such as a professional-use digital video camera for broadcasting, and particularly relates to an image pickup apparatus including a structure for forced air-cooing using a fan.

Description of the Related Art

A professional-use digital video camera for broadcasting is usually designed for a videographer shoots to shoot with carrying a camera body thereof on a shoulder of the videographer. Accordingly, the professional-use digital video camera is provided with a shoulder pad at a part of a bottom of the camera body which contacts the shoulder, in order to reduce a burden applied to the shoulder of the videographer.

This type of digital video camera is required to be miniaturized. However, on the other hand, such a digital video camera causes an increase of power consumption by requirements of high functionality and high definition. Thus, there is a problem of, for example, thermal runaway due to an increase of exterior temperature and an excess over the guaranteeing temperature of an internal electric element.

In a case of a shoulder-mount-typed digital video camera, since a face of the videographer is positioned in proximity to one side of a camera body, a technique of performing forced cooling with a fan with an inlet and an outlet provided on the other side of the camera body, has been proposed (Japanese Laid-Open Patent Publication (Kokai) No. 2009-151037). In this proposal, a compartment is provided so as to prevent, for example, raindrops from entering into the inside of the camera body even if in a case where the inlet and the outlet are formed with the bigger size.

However, no duct structure consisting the inlet and the outlet connected with each other is provided in Japanese Laid-Open Patent Publication (Kokai) No. 2009-151037 described above. Thus, it is difficult to radiate heat generated by an internal electric element, effectively. Meanwhile, providing the duct structure consisting the inlet and the outlet connected with each other in the apparatus body results in increasing size of the apparatus.

SUMMARY OF THE INVENTION

The present invention provides an image pickup apparatus capable of improving heat radiation efficiency by providing a duct structure an inlet and an outlet connected with each other, while maintaining a miniaturized body of an apparatus.

Accordingly, the present invention provides an image pickup apparatus comprising a fan, an inlet arranged on one side of an apparatus body of the image pickup apparatus in a width direction, the inlet being configured to inhale external air by drive of the fan, an outlet arranged on the one side of the apparatus body in the width direction, the outlet being configured to generate an airflow of the air inhaled through the inlet by the drive of the fan and to discharge the airflow, and a duct provided inside of the apparatus body, the duct having an inhaling part interconnecting with the inlet, a discharging part interconnecting with the outlet, and a cooling part connected to each of the inhaling part and the discharging part, wherein each of the inhaling part and the discharging part is connected to the cooling part in a direction intersecting with the cooling part.

According to an embodiment of the present invention, an image pickup apparatus, which is capable of improving heat radiation efficiency by providing a duct structure an inlet and an outlet connected with each other, while maintaining a miniaturized body of an apparatus, can be provided.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
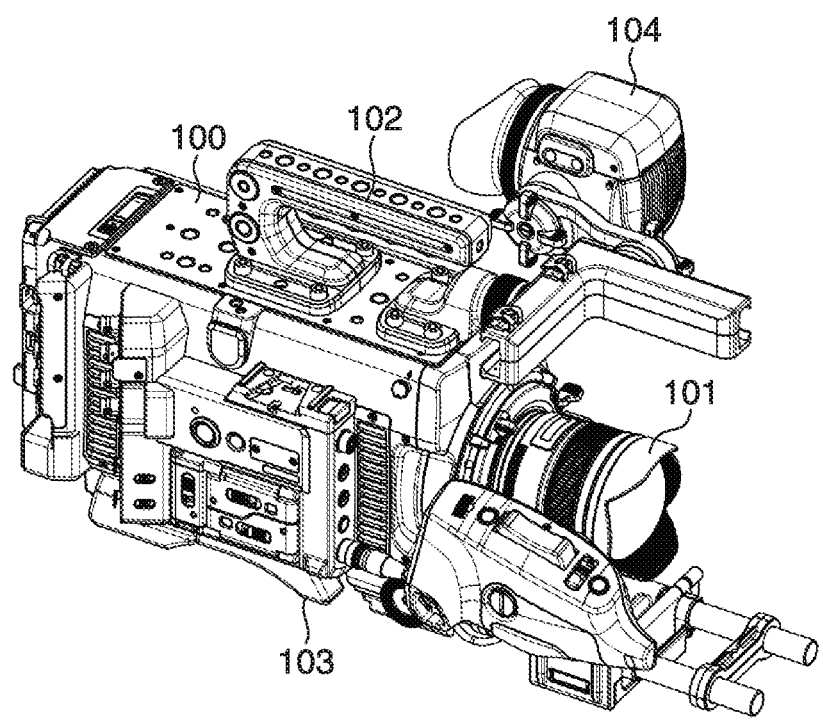
FIG. 1 is a perspective view of a digital video camera that is an example of an embodiment of an image pickup apparatus of the present invention.
Figure 2:
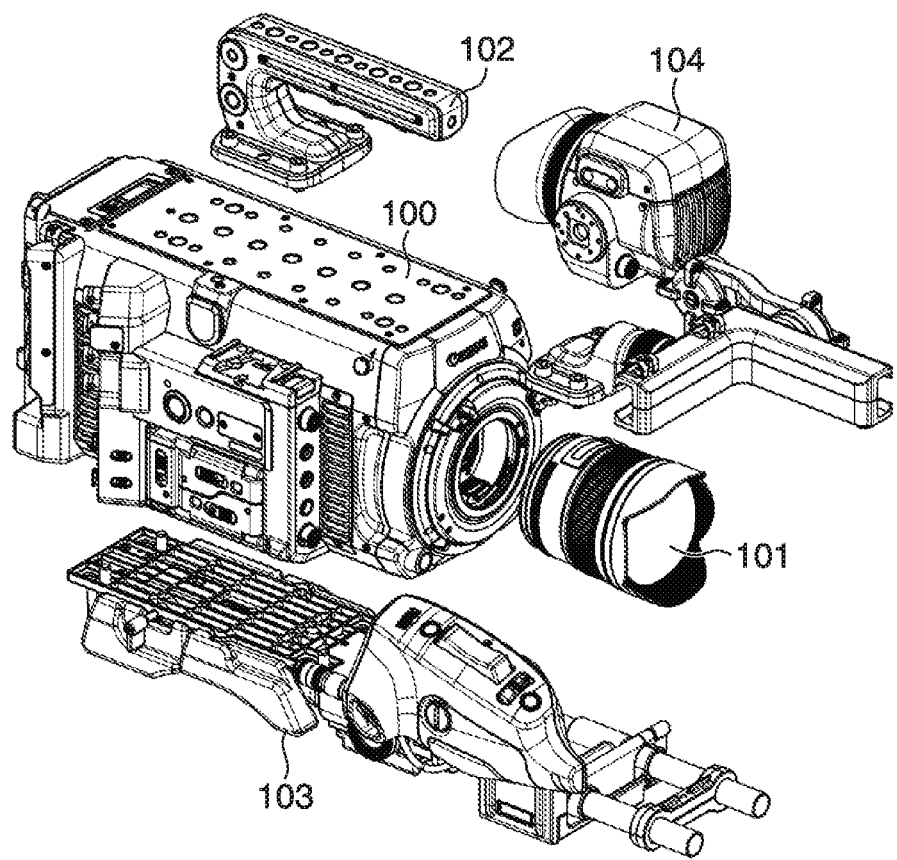
FIG. 2 is an exploded perspective view of the digital video camera shown in FIG. 1.

FIG. 1 is a perspective view of a digital video camera that is an example of an embodiment of an image pickup apparatus of the present invention. FIG. 2 is an exploded perspective view of the digital video camera shown in FIG. 1.

As shown in FIGS. 1 and 2, the digital video camera according to the present embodiment is provided with an interchangeable lens barrel 101, detachably, on the front side of a camera body 100 (the side of an object), and a shoulder unit part 103, detachably, on a bottom part of the camera body 100. A top part of the camera body 100 is provided with a handle part 102 and a viewfinder part 104, respectively detachably. The viewfinder part 104 is arranged on the front side of the handle part 102 and also at a position above the lens barrel 101. The lens barrel 101 and the viewfinder part 104 are electrically connected to the camera body 100 through contact parts, respectively, while equipped on the camera body 100. The camera body 100 corresponds to an example of an embodiment of an apparatus body of the present invention.

Figure 3A:
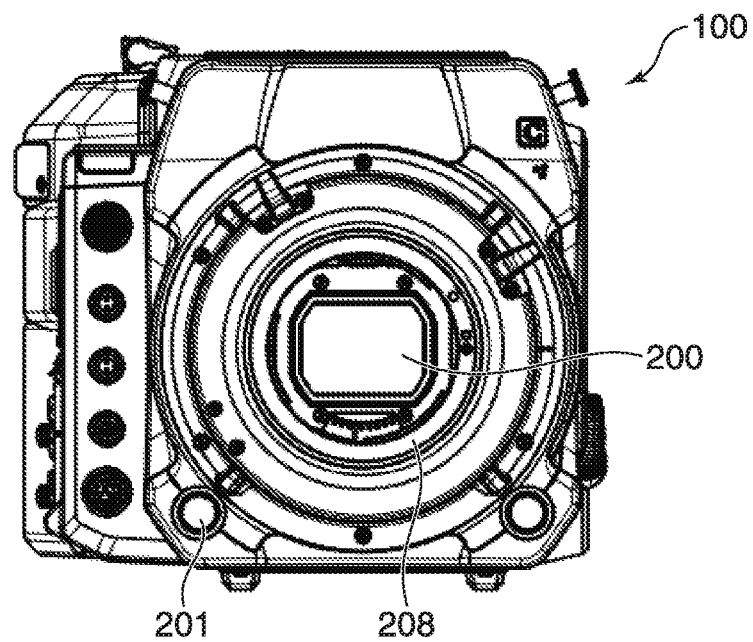
FIG. 3A is a view of a camera body viewed from the front side thereof.
Figure 3B:
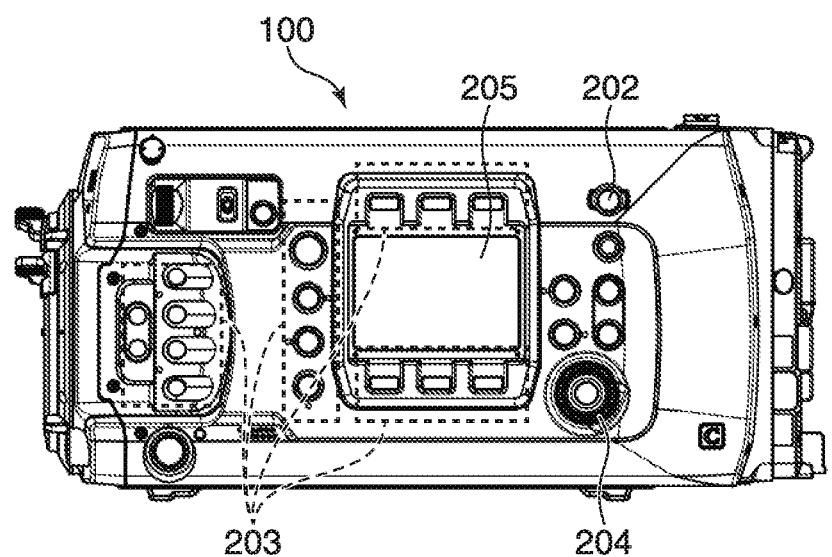
FIG. 3B is a side view showing the right side of the camera body viewed from the front side thereof.
Figure 4A:
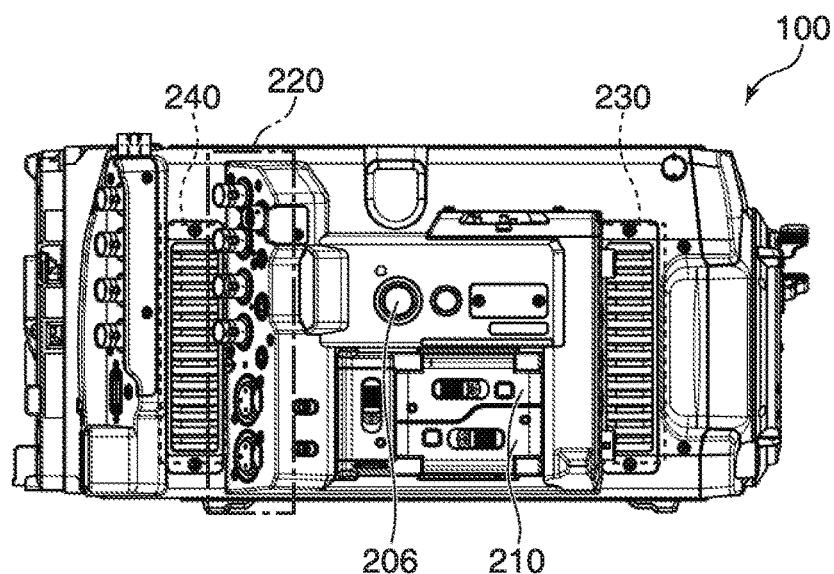
FIG. 4A is a side view showing the left side of the camera body viewed from the front side thereof.
Figure 4B:
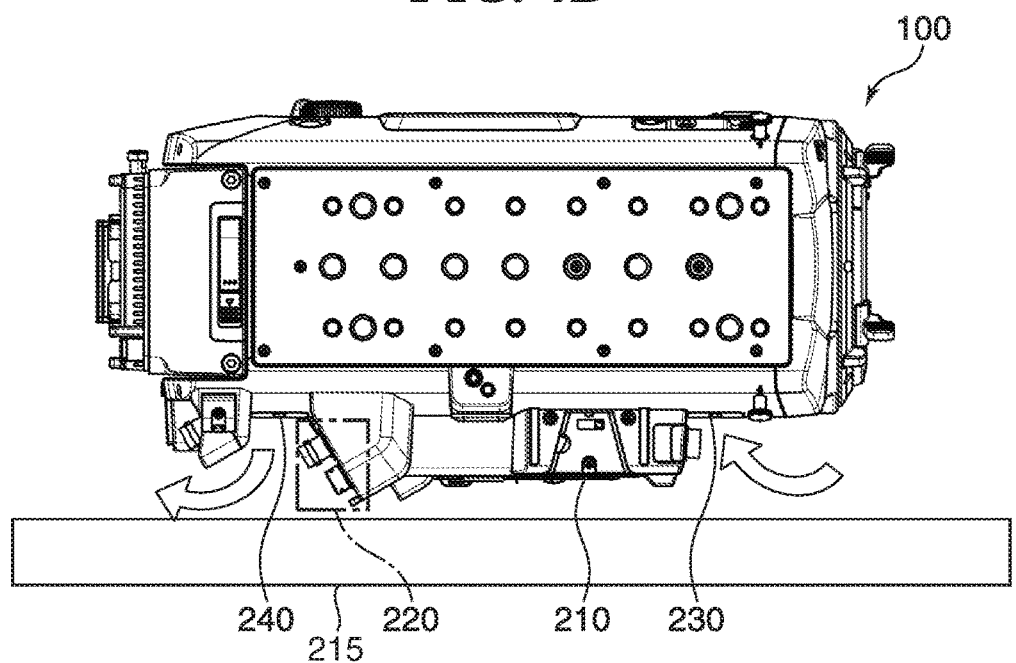
FIG. 4B is a view showing a state where a side part on the left side of the camera body viewed from the side of the front abuts on a wall, viewed from the side of a top of the camera body.

FIG. 3A is a view of the camera body 100 viewed from the front side thereof. FIG. 3B is a side view showing the right side of the camera body 100 viewed from the front side thereof. FIG. 4A is a side view showing the left side of the camera body 100 viewed from the front side thereof. FIG. 4B is a view showing a state where a side part on the left side of the camera body 100 viewed from the side of the front abuts on a wall 215, viewed from the side of a top of the camera body 100.

As shown in FIG. 3A, the camera body 100 is provided with an image pickup button 201, an image pickup element 200, and the like. The image pickup element 200 consists of, for example, a CMOS sensor or a CCD sensor. The image pickup element 200 photoelectrically converts an object image that has passed through a shooting optical system of the lens barrel 101 and has been formed, and outputs the converted object image to an image processing part (not shown). As shown in FIG. 3B, a side part on the right side of the camera body 100 viewed from the front side, is provided with a power button 202, an operation-button group 203, an operation dial 204, and a display section 205.

As shown in FIG. 4A, when the camera body 100 is viewed from the front side, the side part on the left side, which is a side part on one side of the camera body 100 in a width direction, is provided with a card lid 210, an external input/output terminal part 220, a shooting button 206, an inlet 230, and an outlet 240. The card lid 210 covers an opening part of a card slot (not shown), such that the opening part is openable. The inlet 230 is arranged on the front side of the camera body 100 (the right side in the figure), and the outlet 240 is arranged on the a back side of the camera body 100. The camera body 100 inhales external air through the inlet 230 by drive of fans 300 to be described later, and discharges an airflow generated by the drive of the fans 300, through the outlet 240.

With the digital video camera according to the present embodiment, a videographer shoots with the shoulder unit part 103 mounted on right shoulder of the videographer. As a result, the face of the videographer abuts on a right side part of the camera body 100 viewed from the front side. In this case, the outlet 240 is located on a left side part of the camera body 100 viewed from the front side. Thus, discharged air from the outlet 240 does not blowing the face of the videographer; accordingly, the videographer does not become uncomfortable.

As shown in FIG. 4B, the card lid 210 and the external input/output terminal part 220 protrude to the outside of the camera body 100 with respect to the inlet 230 and the outlet 240. Therefore, there is no possibility that the wall 215 covers the inlet 230 and the outlet 240. As a result, flows of the air of the inhalation and the discharge, indicated with arrows in FIG. 4B, are prevented from being blocked. Thus, heat radiation can be efficiently performed and cooling of the camera body 100 can be sufficiently performed.

Figure 5:
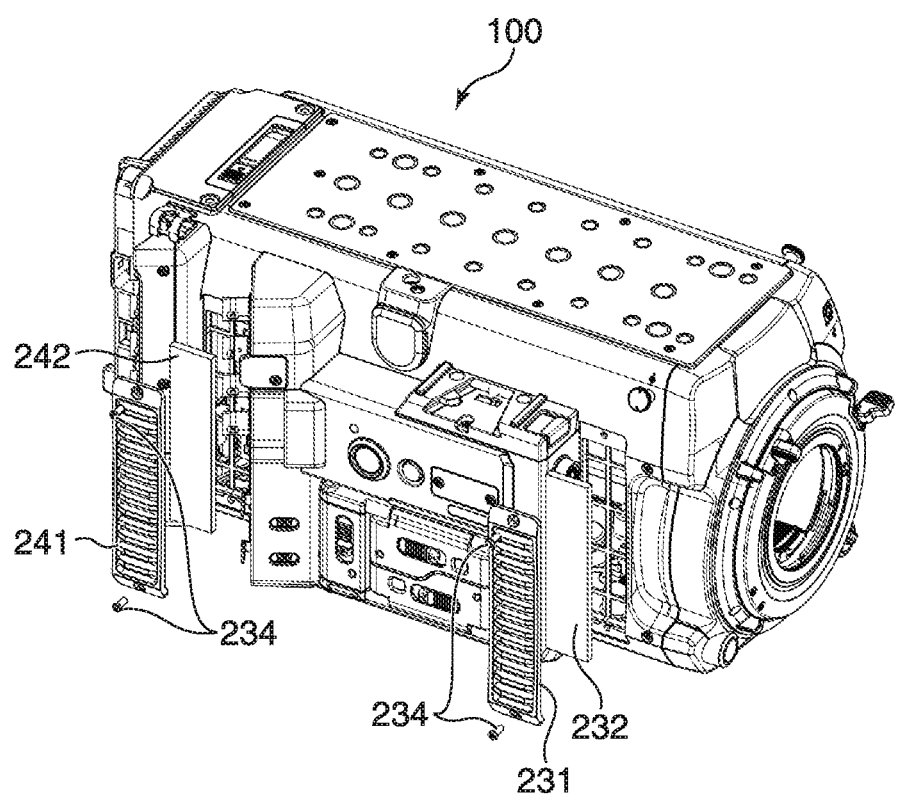
FIG. 5 is a perspective view showing a state where an inlet cover and an outlet cover are removed from an inlet and an outlet of the camera body, respectively.

FIG. 5 is a perspective view showing a state where an inlet cover 231 and an outlet cover 241 are removed from the inlet 230 and the outlet 240 of the camera body 100, respectively. As shown in FIG. 5, the inlet cover 231 and the outlet cover 241 are respectively fixed to the camera body 100 with screws 234.

The inlet cover 231 has an inlet filter 232 integrated in the inside thereof. The inlet filter 232 consists of urethane foam having a complete open-cell structure, which make it possible to prevent dust or the like inhaled from entering the inside together with the air during the inhalation. The inlet filter 232 is a filter that is relatively thick, and can acquire a high dust collection efficiency with respect to the air inhaled through the inlet cover 231.

The outlet cover 241 has an outlet filter 242, consisting of the same material as that of the inlet filter 232, and integrated in the inside thereof. The outlet filter 242 can prevent dust or the like from entering the inside through the outlet cover 241, similarly to the inlet filter 232.

Figure 6:
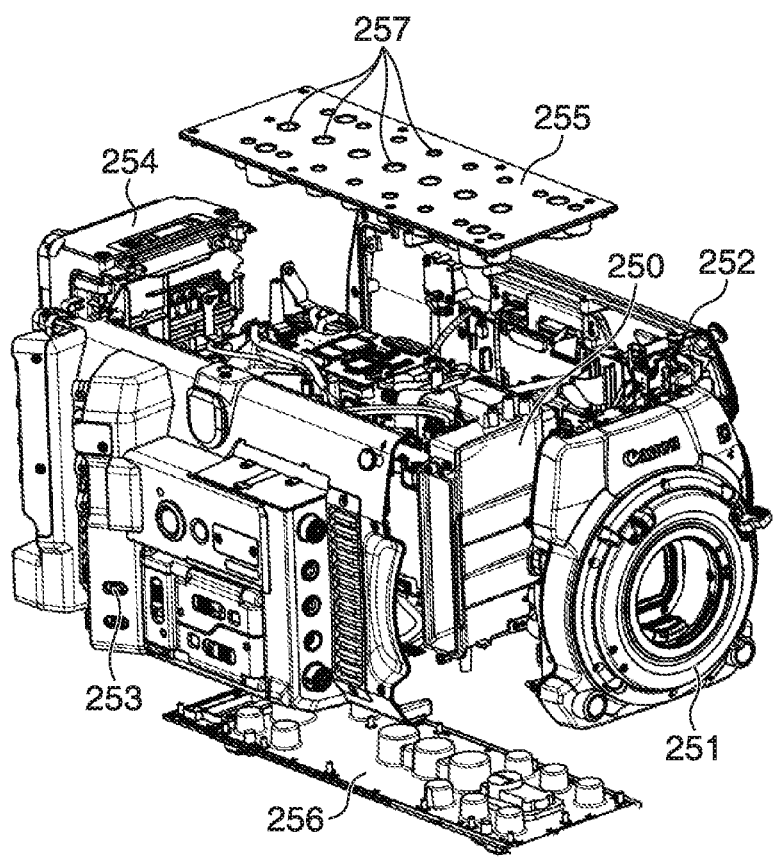
FIG. 6 is an exploded perspective view of the camera body.

FIG. 6 is an exploded perspective view of the camera body 100. As shown in FIG. 6, the camera body 100 has a front cover unit 251, a right cover unit 252, a left cover unit 253, a rear cover unit 254, a top cover unit 255, and a bottom cover unit 256. These cover units 251 to 256 forms an exterior of the camera body 100, and cover a main unit 250. Each of the cover unit 255 and the bottom cover unit 256 is provided with screw holes 257, which makes an external device, an accessory, etc. attachable to the camera body 100.

Figure 7:
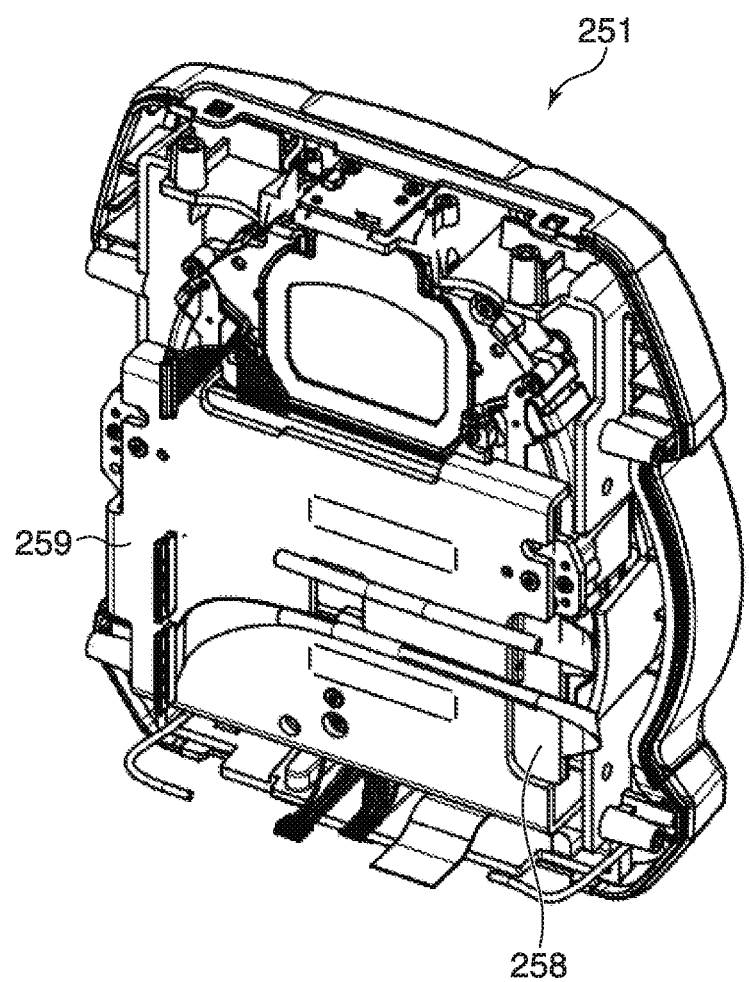
FIG. 7 is a perspective view of a front cover unit viewed from the back side thereof.

FIG. 7 is a perspective view of the front cover unit 251 viewed from the back side thereof. As shown in FIG. 7, the front cover unit 251 is provided with a sensor board 258 on which the image pickup element 200 is mounted, and a mounting part 208 for fixing the lens barrel 101 (see FIG. 3A).

As described above, the image pickup element 200 comprises, for example, a CMOS sensor or a CCD sensor. Thus, there is a problem that, for example, noise increases due to heat generated by the element itself and image quality degrades. A circuit on the sensor board 258 also generates heat and then gives the heat to the image pickup element 200. Thus, there is a need to radiate heat around the image pickup element 200 and the sensor board 258. Accordingly, the heat radiation is performed by a sensor heat radiating plate 259 fixed to the sensor board 258 with, for example, screws.

Figure 8A:
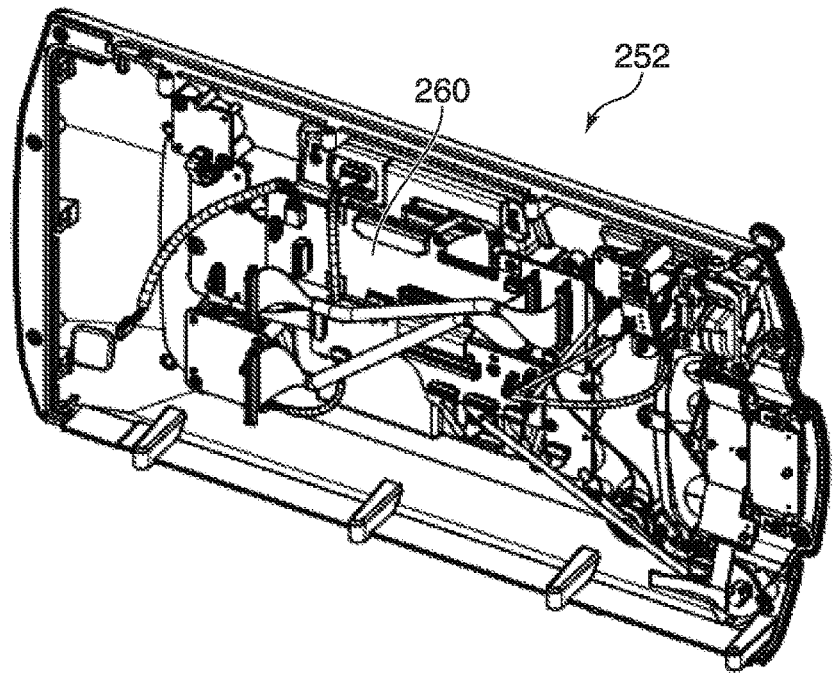
FIG. 8A is a perspective view of a right cover unit viewed from the back side thereof.
Figure 8B:
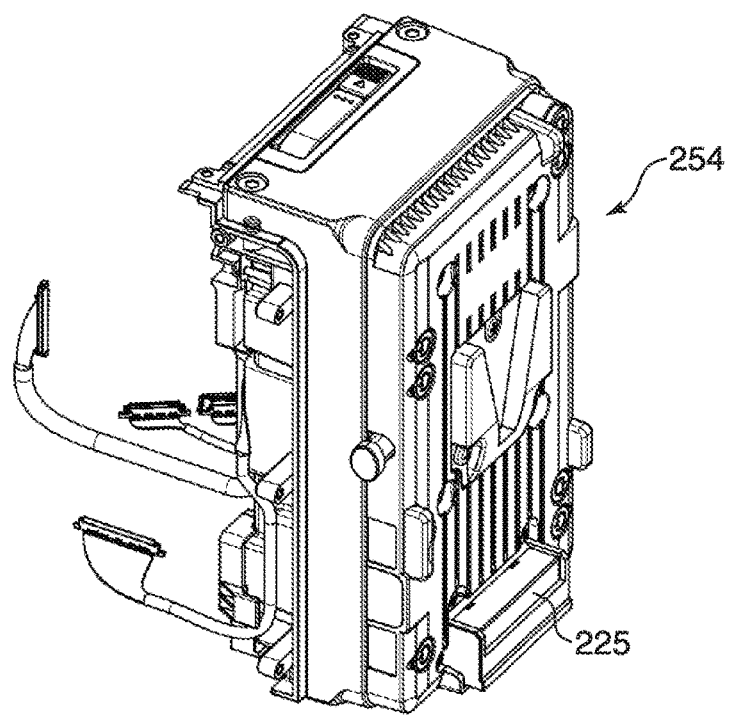
FIG. 8B is a perspective view of a rear cover unit.

FIG. 8A is a perspective view of the right cover unit 252 viewed from the back side thereof. FIG. 8B is a perspective view of the rear cover unit 254. As shown in FIG. 8A, the right cover unit 252 is provided with a display control board 260. The display control board 260 mounts a control IC, not shown, which displays shooting settings, currently-shot images, etc. on the display section 205, and controls the settings of the camera body 100 in accordance with input details of switches, such as the power button 202, the operation-button group 203, and the operation dial 204. The display control board 260 is electrically connected to a main board 400 (see FIG. 11A), to be described later, included in the main unit 250.

As shown in FIG. 8B, the rear cover unit 254 is provided with battery terminals 225. A battery (not shown) supplies power so that the camera body 100 can operate.

Figure 9A:
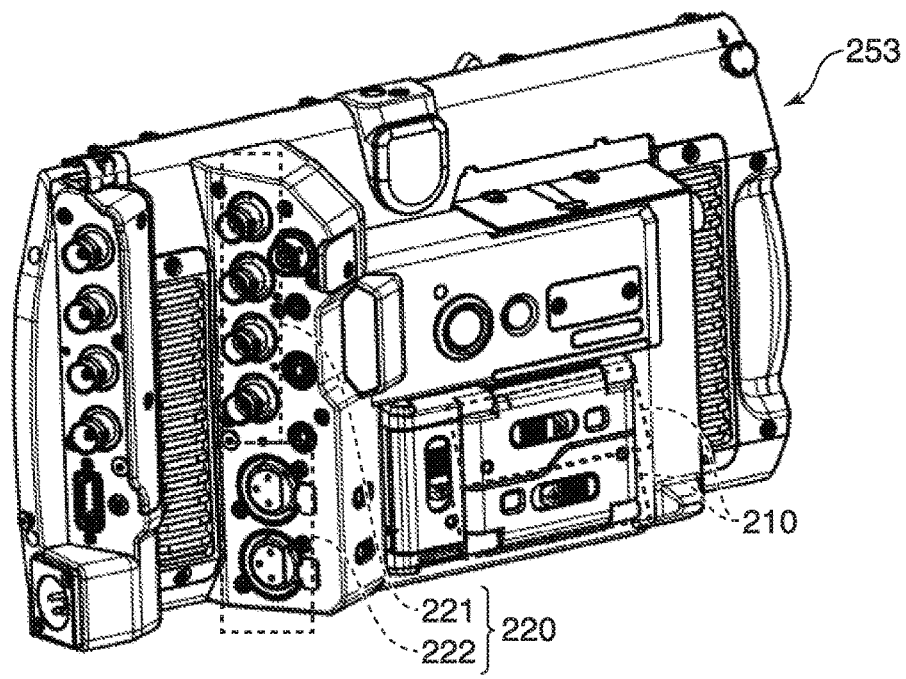
FIG. 9A is a perspective view of a left cover unit viewed from the front side thereof.
Figure 9B:
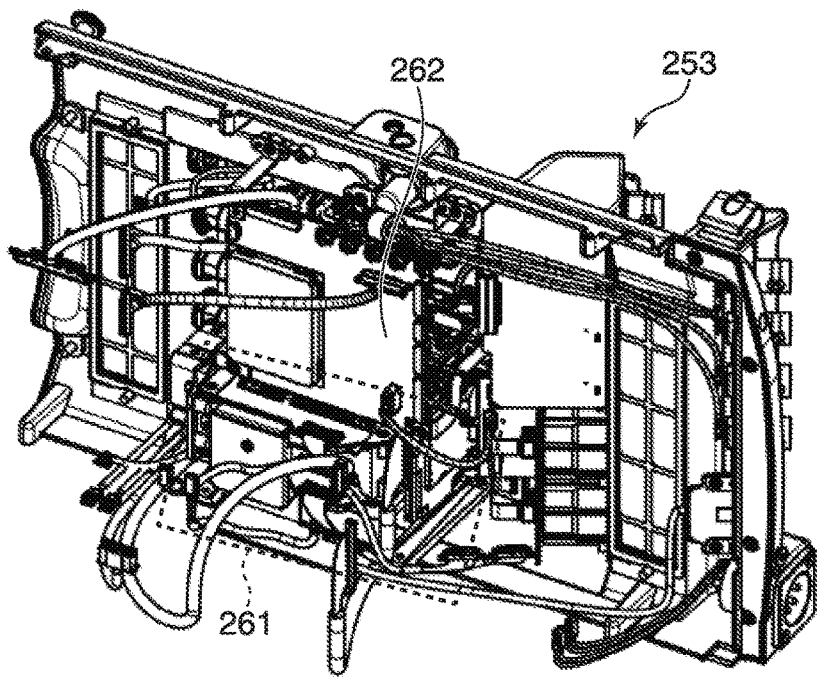
FIG. 9B is a perspective view showing the left cover unit shown in FIG. 9A, viewed from the back side thereof.

FIG. 9A is a perspective view of the left cover unit 253 viewed from the front side thereof. FIG. 9B is a perspective view of the left cover unit 253 shown in FIG. 9A, viewed from the back side thereof.

As shown in FIG. 9A, the left cover unit 253 is provided with audio output terminals 221 and audio input terminals 222 as the external input/output terminal part 220. The audio output terminals 221 and the audio input terminals 222 are respectively connected to a signal control board 262 and a sub-board 401, to be described later, included in the main unit 250. When connected to the audio output terminals 221 and the audio input terminals 222, cables and the like can be drawn out to the back side, in a direction slant to the camera body 100. Thus, the audio output terminals 221 and the audio input terminals 222 are configured so that the cables and the like are prevented from interfering upon shooting. Since it is necessary to arrange a board and the like inside the external input/output terminal part 220, plenty of space is required inside the left cover unit 253.

The left cover unit 253 is provided with the card lid 210. The card lid 210 covers the opening part of the card slot (not shown) of a card board unit 261 to be described later, so that the opening is openable. A storage medium for storing video is inserted into the opening part so as to be detachably attached. The card slot of the card board unit 261 is arranged so that the storage medium, such as a memory card, can be inserted in a lateral direction of the camera body 100 so as to be detachably attached. Accordingly, the insertion and extraction of the storage medium is facilitated.

As shown in FIG. 9B, the left cover unit 253 is provided with, for example, the signal control board 262 and the card board unit 261. The signal control board 262 and the card board unit 261 are connected to the main board 400 and the sub-board 401, to be described later, for example, through wire harnesses, respectively, so that communication of video and audio signals is performed.

Figure 10A:
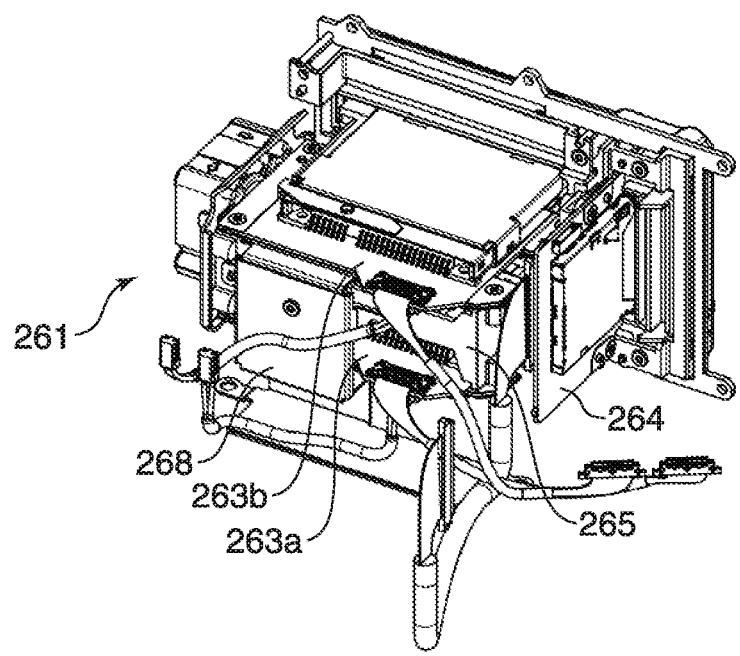
FIG. 10A is a perspective view of a card board unit viewed from the back side thereof.
Figure 10B:
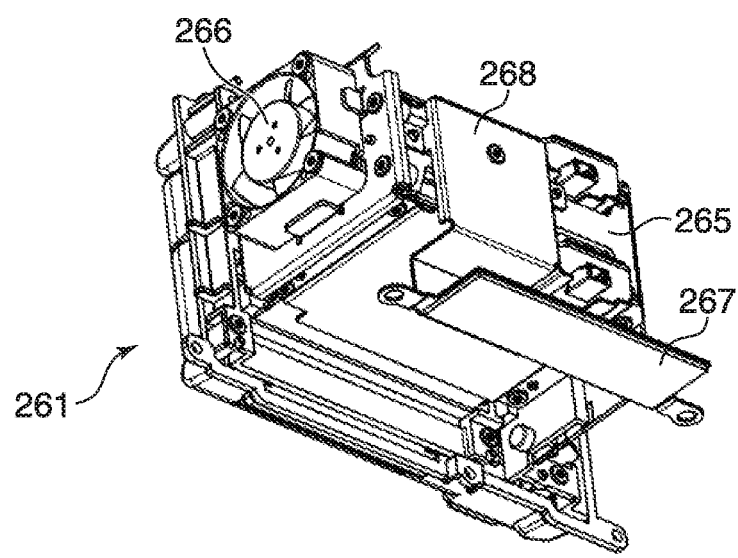
FIG. 10B is a perspective view of the card board unit viewed from the bottom side thereof.

FIG. 10A is a perspective view of the card board unit 261 viewed from the back side thereof. FIG. 10B is a perspective view of the card board unit 261 viewed from the bottom side thereof.

As shown in FIG. 10A, the card board unit 261 is electrically connected to a video compression circuit board 403 to be described later. The card board unit 261 is provided with three boards, the three boards including two card boards 263a and 263b for storing video in the storage medium and a saving card board 264 for saving a setting saving file when the camera body 100 shoots.

In a case where video having a high resolution and a high frame rate is stored, it is necessary to cool the storage medium since an IC inside the storage medium generates heat. Accordingly, each of the card boards 263a and 263b is provided with a heat radiation rubber (not shown) provided so that the heat is radiated to a heat radiation plate 268. The three boards 263a, 263b, and 264 and the heat radiation plate 268 are fixed with, for example, screws, in a state where they have been positioned to a card board base 265 made of metal.

As shown FIG. 10B, the card board base 265 is provided with a card cooling fan 266, through which discharged air 266 blows on the card board base 265 and the heat radiation plate 268 to perform heat radiation. The heat radiation plate 268 is provided with a card heat radiation rubber 267 that is stuck for radiating the heat to the bottom cover unit 256.

Figure 11A:
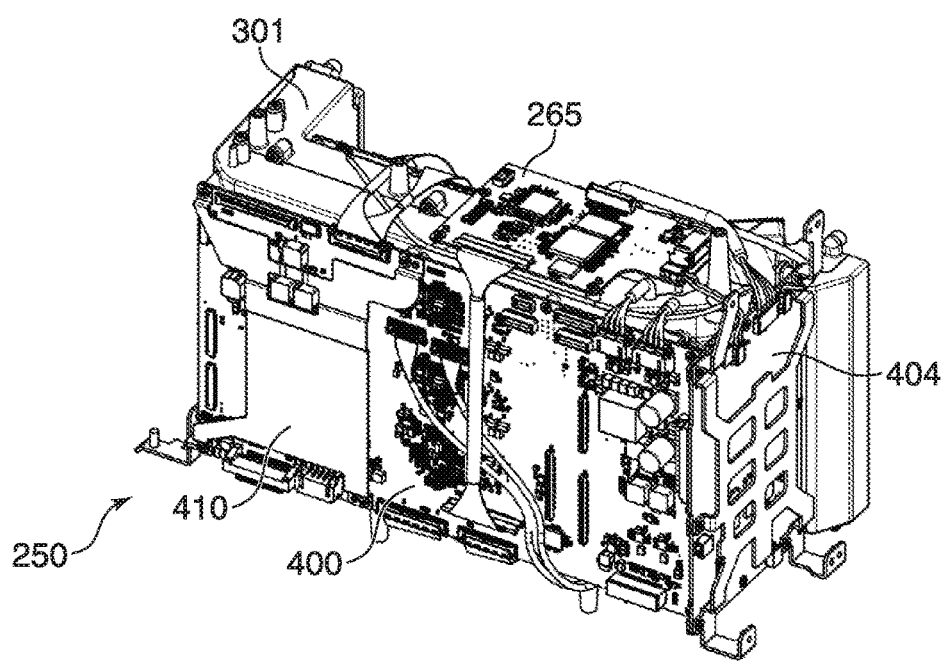
FIG. 11A is a perspective view of a main unit viewed from the back side of the camera body.
Figure 11B:
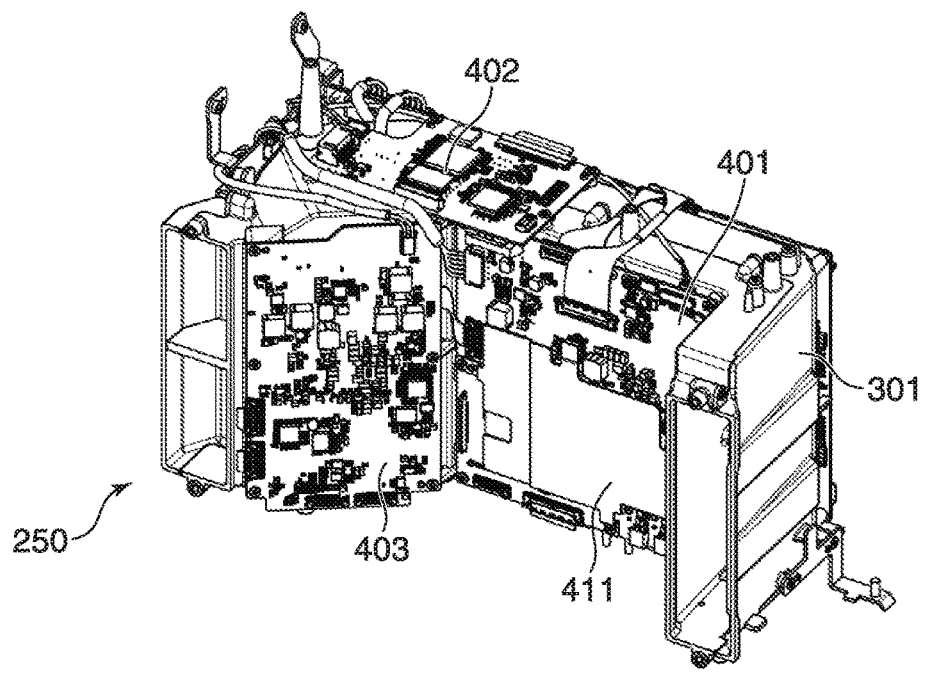
FIG. 11B is a perspective view of the main unit viewed from the front side of the camera body.

FIG. 11A is a perspective view of the main unit 250 viewed from the back side of the camera body 100. FIG. 11B is a perspective view of the main unit 250 viewed from the front side of the camera body 100.

As shown in FIGS. 11A and 11B, the main unit 250 has a fan duct unit 301, the main board 400, the sub-board 401, a network board 402, the video compression circuit board 403, a power supply board 404, a main board heat radiation plate 410, and a sub-board heat radiation plate 411. Each of the main board heat radiation plate 410 and the sub-board heat radiation plate 411 is formed of a sheet metal member, such as copper or aluminum, having excellent heat conductivity. The respective sheet metal members perform heat radiation to heat-producing components mounted on the main board 400 and the sub-board 401.

Power consumption decreases in the order of the main board 400, the sub-board 401, the video compression circuit board 403, and the power supply board 404 in the camera body 100, and each companies with heat generation. The plurality of boards 400 to 404 are fixed to the fan duct unit 301 and then heat transfer is performed so that the plurality of boards 400 to 404 can be cooled at once. High-speed communication is required to be performed between the main board 400, the sub-board 401, the network board 402, and the video compression circuit board 403. Thus, for example, thin-line coaxial wires are used for connecting between the respective boards.

Next, the main board 400, the sub-board 401, the network board 402, the video compression circuit board 403, and the power supply board 404 will be described with reference to FIGS. 12A to 15.

Figure 12A:
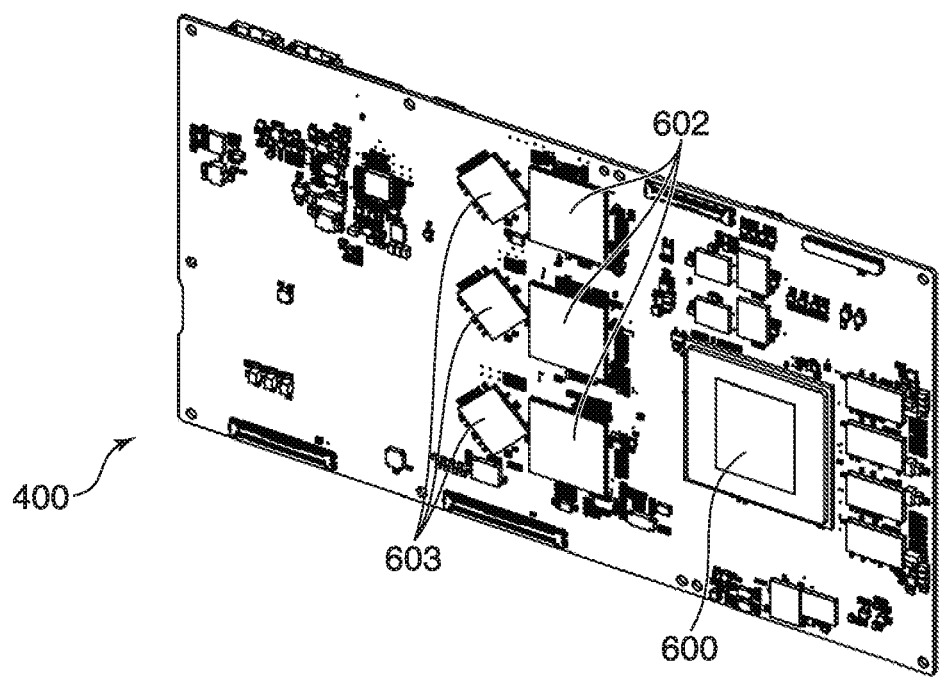
FIG. 12A is a perspective view of a main board viewed from the side of a surface to be attached to a fan duct unit.
Figure 12B:
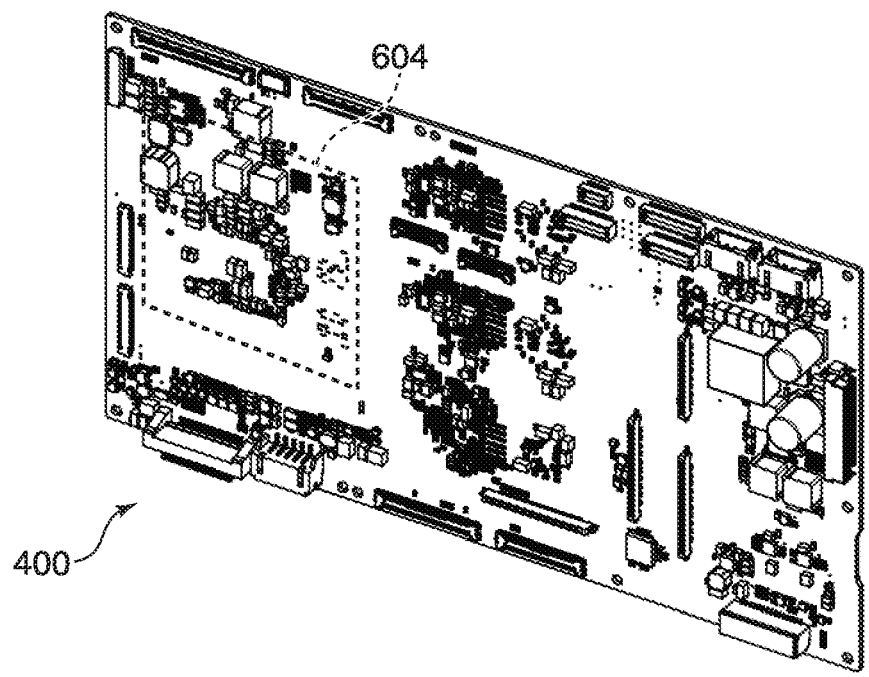
FIG. 12B is a perspective view of the main board shown in FIG. 12A, viewed from the back side thereof.

FIG. 12A is a perspective view of the main board 400 viewed from the side of a surface to be attached to the fan duct unit 301. FIG. 12B is a perspective view of the main board 400 shown in FIG. 12A, viewed from the back side thereof.

As shown in FIGS. 12A and 12B, since electrically connected to all electronic devices, the main board 400 is a board on which a large number of ICs are mounted, and is occupying an area largest in the camera body 100. A front-end IC 600 that processes a signal from the sensor board 258, video processing ICs 602 that perform processing, such as color adjustment, on video, memories 603 to be used for these ICs 600 and 602, and the like are mounted on the side of the main board 400 shown in FIG. 12A. Because of large power consumption and a large heating value, the front-end IC 600, the video processing ICs 602, and the memories 603 are mounted on the side of the fan duct unit 301. Heat generated by the front-end IC 600, the video processing ICs 602, and the memories 603, is transferred to the fan duct unit 301, with using heat radiation rubbers (not shown).

Circuit components 604 for supplying power to the front-end IC 600 and the video processing ICs 602 are mounted on the side of the main board 400 shown in FIG. 12B. Heat generated by the circuit components 604 is transferred to the main board heat radiation plate 410 (see FIG. 11A) so as to be radiated.

Figure 13A:
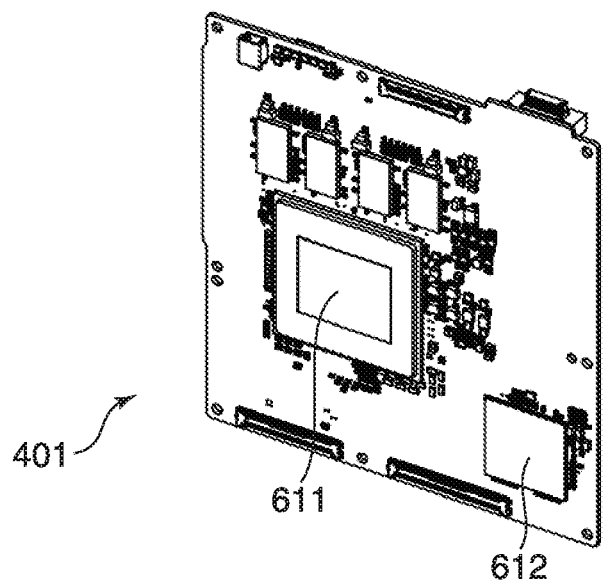
FIG. 13A is a perspective view of a sub-board viewed from the side of a surface to be attached to the fan duct unit.
Figure 13B:
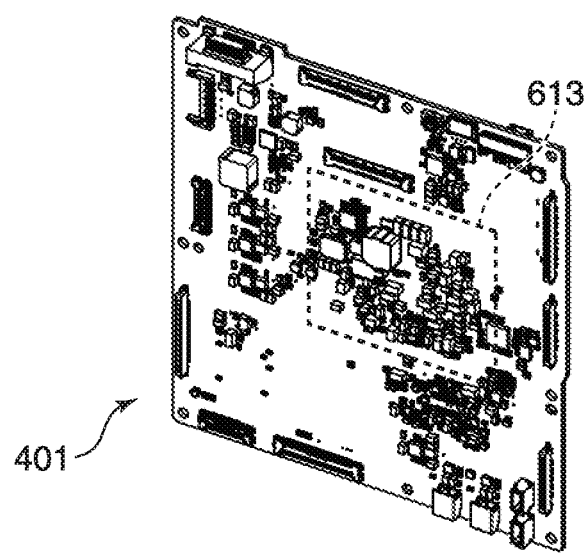
FIG. 13B is a perspective view of the sub-board shown in FIG. 13A, viewed from the back side thereof.

FIG. 13A is a perspective view of the sub-board 401 viewed from the side of a surface to be attached to the fan duct unit 301. FIG. 13B is a perspective view of the sub-board 401 shown in FIG. 13A, viewed from the back side thereof.

For example, a back-end IC 611 and a format conversion IC 612, which receive video data from the video processing ICs 602 of the main board 400 and perform video format conversion optimum for each piece of external input/output, are mounted on the side of the sub-board 401 shown in FIG. 13A. The back-end IC 611 and the format conversion IC 612 are also mounted on the sub-board 401 on the side of the fan duct unit 301. Heat generated by the back-end IC 611 and the format conversion IC 612 is transferred to the fan duct unit 301, with using heat radiation rubbers (not shown).

Circuit components 613 for supplying power to the back-end IC 611 and the format conversion IC 612 are mounted on the side of the sub-board 401 shown in FIG. 13B. Heat generated by the circuit components 613 is transferred to the sub-board heat radiation plate 411 (refer to FIG. 11B) so as to be radiated.

Figure 14A:
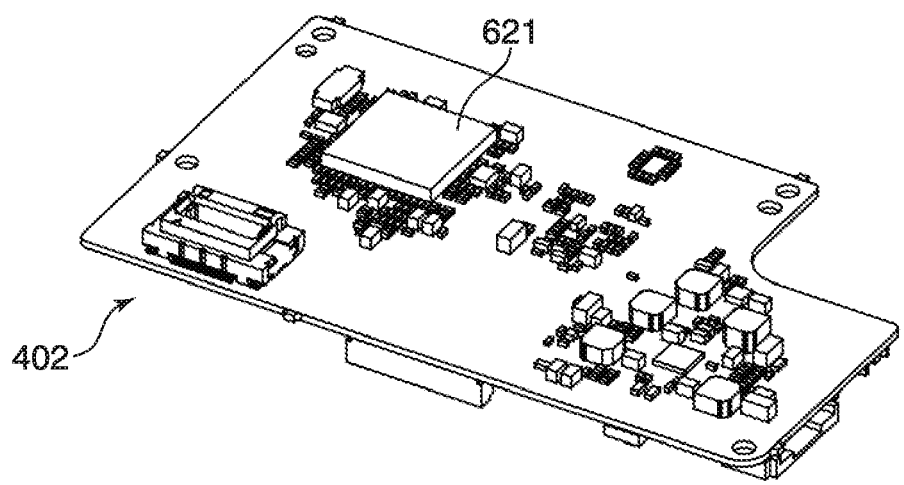
FIG. 14A is a perspective view of a network board.
Figure 14B:
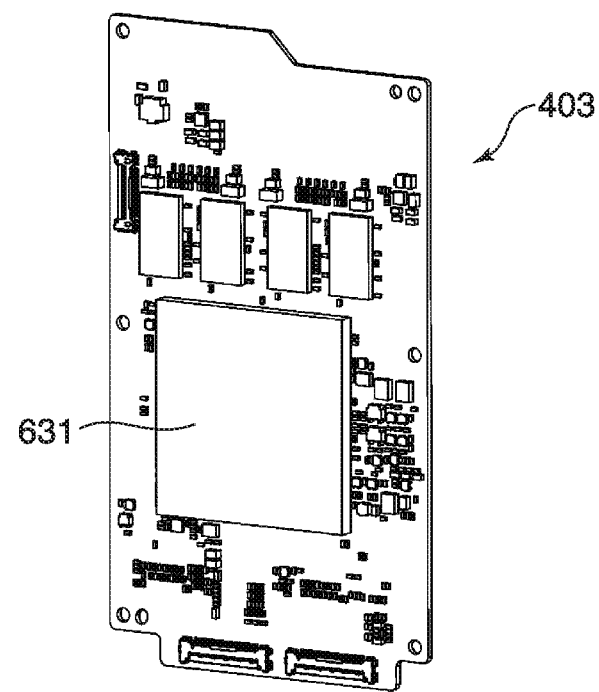
FIG. 14B is a perspective view of a video compression circuit board.

FIG. 14A is a perspective view of the network board 402. FIG. 14B is a perspective view of the video compression circuit board 403.

As shown FIG. 14A, the network board 402 mounts a communication IC 621 that controls wireless communication, such as WiFi. The communication IC 621 can transmit video shot in the camera body 100, to an external device. As shown in FIG. 14B, the video compression circuit board 403 mounts a video compression IC 631 for receiving the video data from the video processing ICs 602 of the main board 400 and writing the video in the storage medium with a high resolution at a high frame rate.

Figure 15:
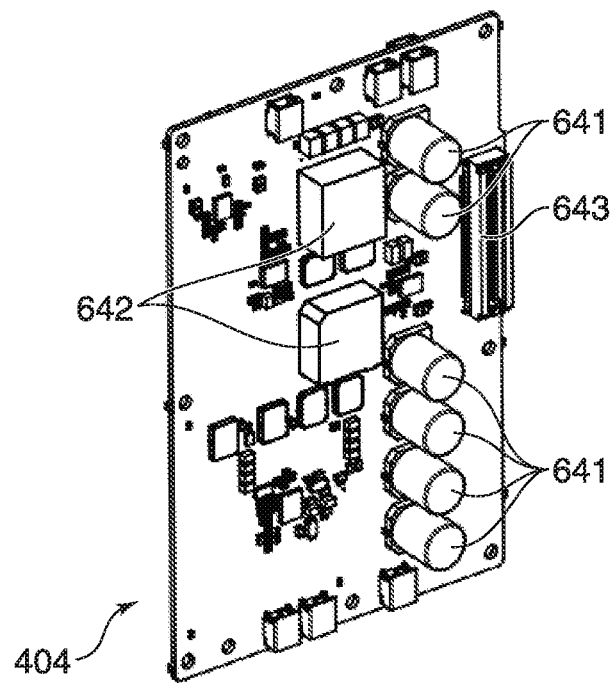
FIG. 15 is a perspective view of a power supply board.

FIG. 15 is a perspective view of the power supply board 404. The power supply board 404 supplies power to the main board 400, the sub-board 401, the network board 402, the video compression circuit board 403, and the electronic devices in the camera body 100. Since power consumption of the entire camera body 100 is large, the power supply board 404 mounts components, such as relatively large capacitors 641, coils 642, etc. The power supply board 404 is connected to the main board 400 by a B-to-B connector 643, and supplies the power to a large number of the electronic devices via the majority of the number of pins of the B-to-B connector 643.

Figure 16A:
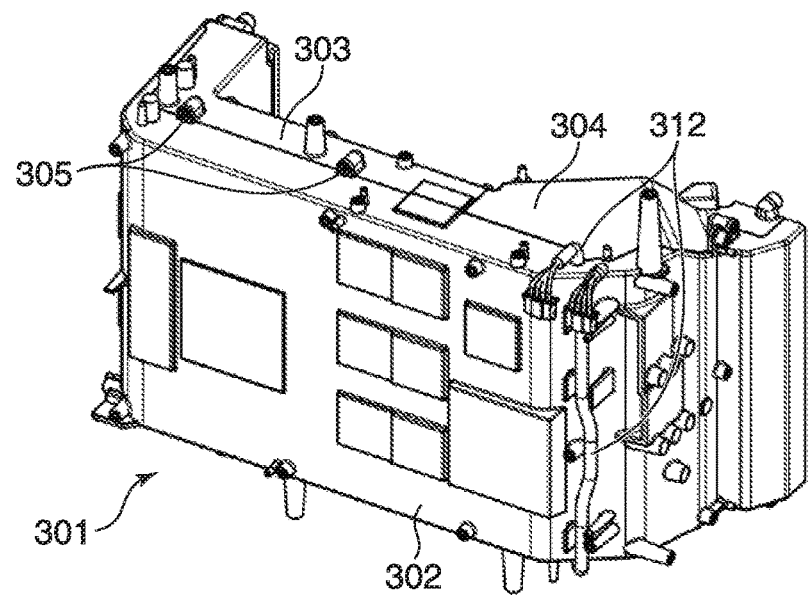
FIG. 16A is a perspective view of the fan duct unit viewed from the back side of the camera body.
Figure 16B:
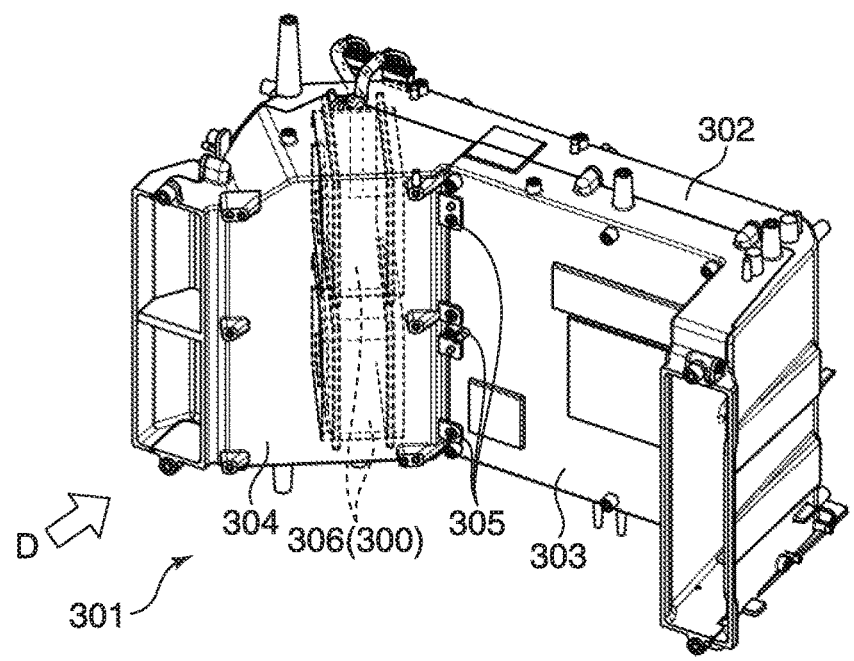
FIG. 16B is a perspective view of the fan duct unit viewed from the front side of the camera body.
Figure 17A:
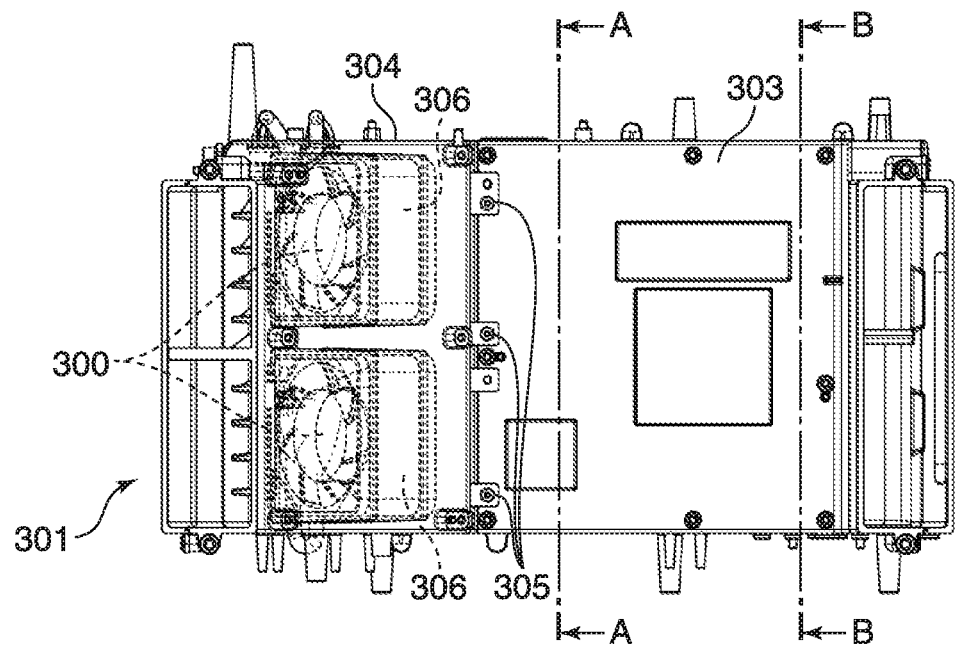
FIG. 17A is a side view of the fan duct unit viewed in a direction of arrow D shown in FIG. 16B.
Figure 17B:
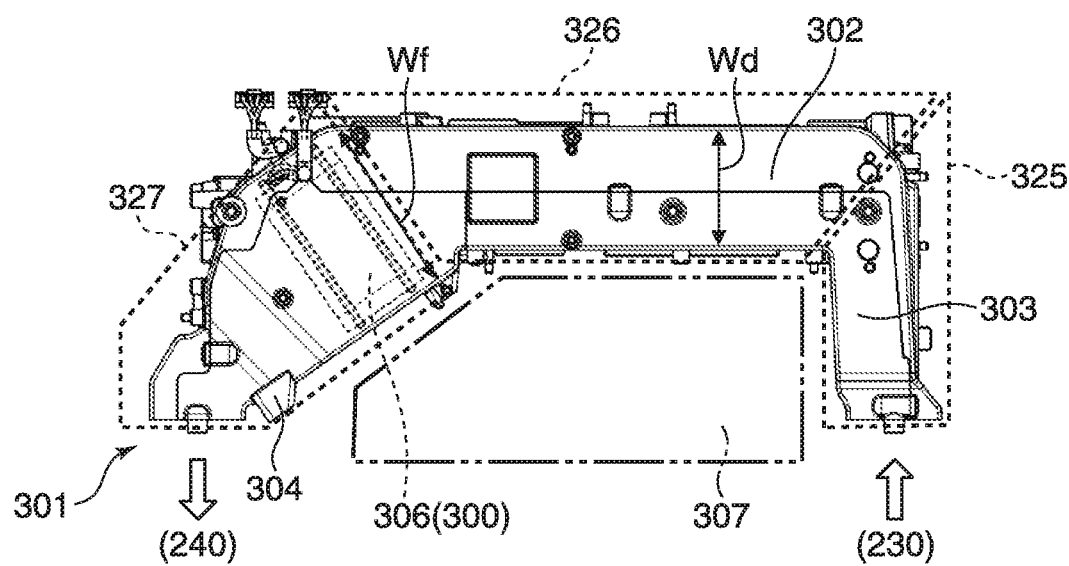
FIG. 17B is a top view of the fan duct unit shown in FIG. 17A.

FIG. 16A is a perspective view of the fan duct unit 301 viewed from the back side of the camera body 100. FIG. 16B is a perspective view of the fan duct unit 301 viewed from the front side of the camera body 100. FIG. 17A is a side view of the fan duct unit 301 viewed in a direction of arrow D shown in FIG. 16B. FIG. 17B is a top view of the fan duct unit 301 shown in FIG. 17A.

As shown in FIGS. 16A and 16B, the fan duct unit 301 has a right duct 302, a left duct 303, and a left duct rear 304 fixed thereto with screws 305. As shown in FIGS. 16B and 17A, the two fans 300, each being a small axial fan integrated in a fan rubber 306, are arranged in a row so as to be perpendicular to a direction of an airflow in which the air flows into a cooling part 326, inside the fan duct unit 301. Adopting the small axial fans as the fans 300, can miniaturize the fan duct unit 301, therefore, the camera body 100 is miniaturized. The fans 300 are integrated in the fan rubbers 306 so that vibrations that occur when the fans 300 rotate are reduced.

In FIG. 17B, the fan duct unit 301 is mainly divided into an inhaling part 325, the cooling part 326, and a discharging part 327, each shown with a broken line. The inhaling part 325 interconnects with the inlet 230 provided to the left cover unit 253 of the camera body 100, and supplies the air from the outside of the camera body 100 to the cooling part 326.

The cooling part 326 performs heat exchange with the air from the outside by right duct fins 331 and left duct fins 341 for cooling to be described later. Accordingly, the fan duct unit 301 is cooled so that the ICs mounted on, for example, the main board 400 and the sub-board 401 can be cooled. The discharging part 327 interconnects with the outlet 240 provided to the left cover unit 253 of the camera body 100, and discharges the air heated during the heat exchange.

Here, the cooling part 326 extends, in an optical axial direction, along an inner surface of an exterior of the right cover unit 252 which forms a side part on the other side of the camera body 100 in the width direction when viewed from the front side of the camera body 100. The inhaling part 325 is connected to an end part of the cooling part 326 on the front side of the camera body 100, while intersecting at a substantially right angle against the end part of the cooling part 326 on the front side of the camera body 100. The discharging part 327 is connected to an end part of the cooling part 326 on the back side of the camera body 100, while intersecting at an obtuse angle against the end part of the cooling part 326 on the back side of the camera body 100. Accordingly, the fan duct unit 301 has a substantially C shape.

In FIG. 17B, Wd represents a width dimension of a combination of the right duct 302 and the left duct 303. Wf represents a width dimension of each of the fans 300. In the fan duct unit 301 according to the present embodiment, the fans 300 are arranged in proximity to a connection part between the cooling part 326 and the discharging part 327 so that the width dimension Wd of the combination of the right duct 302 and the left duct 303 can be made to be smaller than the width dimension Wf of each of the fans 300 (Wd<Wf). As a result, the fan duct unit 301 can be reduced in thickness, and, furthermore, the camera body 100 can be reduced in thickness.

The fan duct unit 301 is made to have the substantially C shape so that the main board 400 having a relatively large area can be arranged on an outer surface of the cooling part 326 (the upper side in FIG. 17B) and the sub-board 401 having a relatively small area can be arranged on an inner surface of the cooling part 326. The right duct fins 331 of the right duct 302 on the outside of the cooling part 326 (refer to FIG. 21B) can be lengthened in a direction in which the air flows so that the main board 400 can be effectively cooled. Here, the sub-board 401 corresponds to an example of a first board arranged on the surface of the cooling part 326, according to the embodiment of the present invention, on the side on which the inlet 230 and the outlet 240 are open. The main board 400 corresponds to an example of a second board arranged on the surface on the side opposite to the surface of the cooling part 326 according to the embodiment of the present invention, on which the first board is arranged.

Furthermore, the fan duct unit 301 is made so as to have the substantially C shape so that a space 307 can be provided to a part on the inside of the fan duct unit 301 (the lower side in FIG. 17B). Each of the card board unit 261 and the external input/output terminal part 220 has a large depth dimension in the width direction of the camera body 100, and requires plenty of space in the width direction of the camera body 100. According to the present embodiment, the card board unit 261 is arranged on an inside part of the substantially C shape of the fan duct unit 301, namely, in the space 307 surrounded by the inhaling part 325, the cooling part 326, and the discharging part 327. Thus, the camera body 100 in the width direction can be reduced in thickness. Accordingly, miniaturization of the camera body 100 can be made.

As shown in FIG. 17B, the fan duct unit 301 is made so as to have the substantially C shape, which makes it possible for the inlet 230 and the outlet 240 to be arranged on the left cover unit 253. The right duct 302, the left duct 303, and the left duct rear 304 are formed of a metal material, such as aluminum or magnesium. The fan rubbers 306 are formed of an elastic material, such as silicon.

Figure 18A:
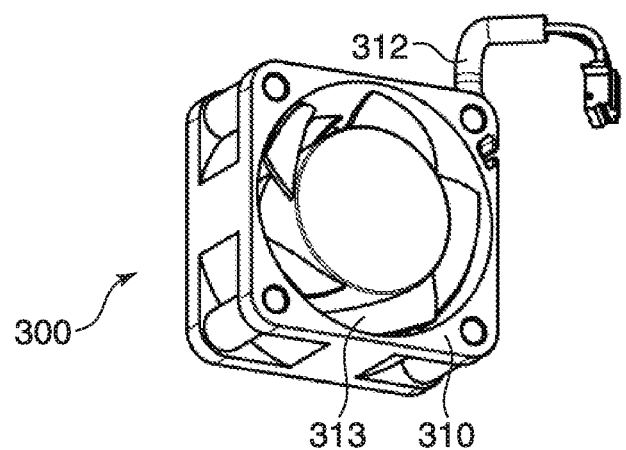
FIG. 18A is a perspective view of a fan.
Figure 18B:
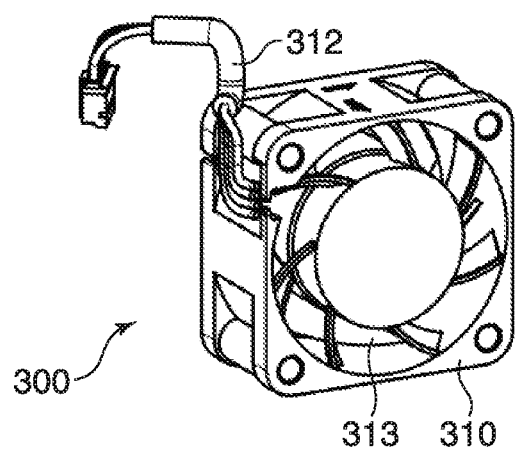
FIG. 18B is a perspective view of the fan shown in FIG. 18A, viewed from the back side thereof.

Next, referring to FIGS. 18A and 18B, the description of the fans 300 will be given. FIG. 18A is a perspective view of a fan 300. FIG. 18B is a perspective view of the fan 300 shown in FIG. 18A, viewed from the back side thereof.

As shown in FIGS. 18A and 18B, the fan 300 has an exterior formed of a resin-made frame 310. The fan 300 has a fan wire 312 for electrically connecting to the main board 400, and a fan board (not shown). The fan 300 holds a motor (not shown), to be electrically connected through the fan board, inside thereof. The motor rotates blades 313 so as to generate difference in pressure to supply with air. As a rotation detecting means for the blades 313, each of the blades 313 is provided with a magnet (not shown), and the fan board is provided with a Hall element (not shown), which detects the number of rotations of the blades 313 and performs feedback control so that the blades 313 acquire a predetermined number of rotations.

Accordingly, the fan 300 has a function capable of inhaling air from the inhalation side and discharging from the discharge side, and can also control the number of rotations. Typically, the axial fan can acquire a sufficient, large air volume even by rotating the blades 313 at a low speed. Furthermore, by rotating the blades 313 at a low speed, annoying noise, such as wind noise a motor sound, etc., can be reduced. Thus, the construction is optimum for the digital video camera.

Figure 19:
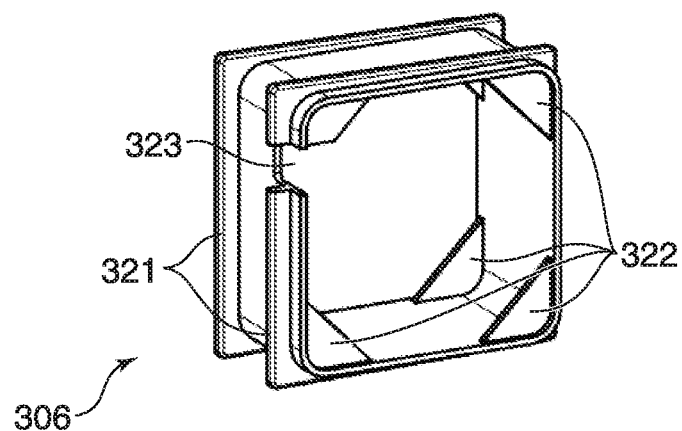
FIG. 19 is a perspective view of a fan rubber.

Next, referring to FIGS. 19 and 20, the description of the fan rubbers 306 will be given. FIG. 19 is a perspective view of a fan rubber 306. As shown in FIG. 19, the fan rubber 306 is provided with outer ribs 321, inner ribs 322, and a notch portion 323 that are formed of a rubber member, such as silicon rubber. The inner ribs 322 are provided at two pairs of four corners on the inside of the fan rubber 306.

Figure 20A:
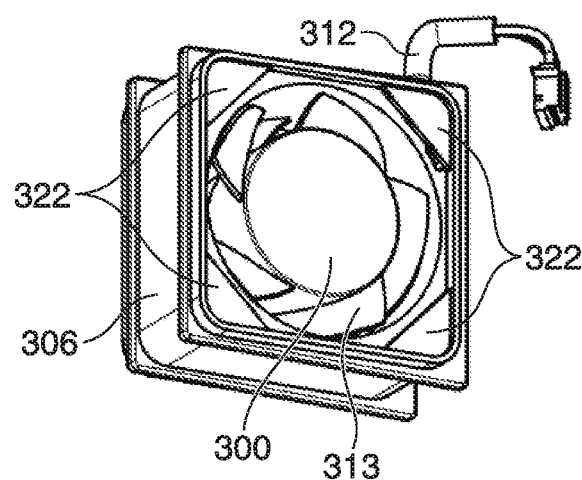
FIG. 20A is a perspective view showing a state where the fan is integrated in the fan rubber, viewed from the inhalation side of the fan.
Figure 20B:
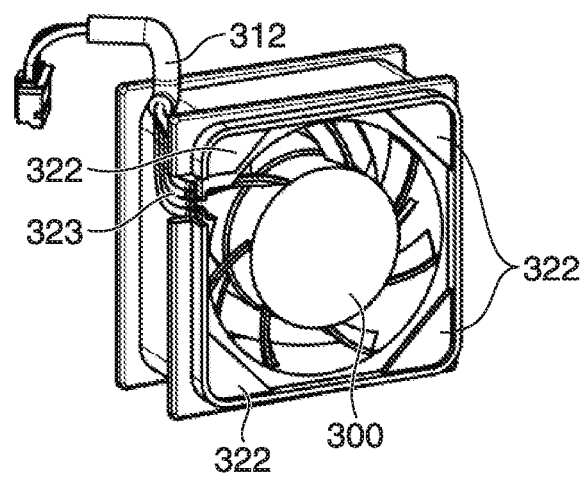
FIG. 20B is a perspective view showing the state where the fan is integrated in the fan rubber, viewed from the discharge side of the fan.

FIG. 20A is a perspective view showing a state where the fan 300 is integrated in the fan rubber 306, viewed from the inhalation side of the fan 300. FIG. 20B is a perspective view showing the state where the fan 300 is integrated in the fan rubber 306, viewed from the discharge side of the fan 300.

As shown in FIG. 20A, the fan rubber 306 holds the fan 300 while sandwiching the fan 300 by the inner ribs 322 so that openings on the inhalation side and on the discharge side of the fan 300 are not covered. In this case, as shown in FIG. 20B, the fan wire 312 of the fan 300 is drawn out from the notch portion 323, which can make assembly with no gap formed between an outer diameter of the fan 300 and an inner diameter of the fan rubber 306.

Figure 21A:
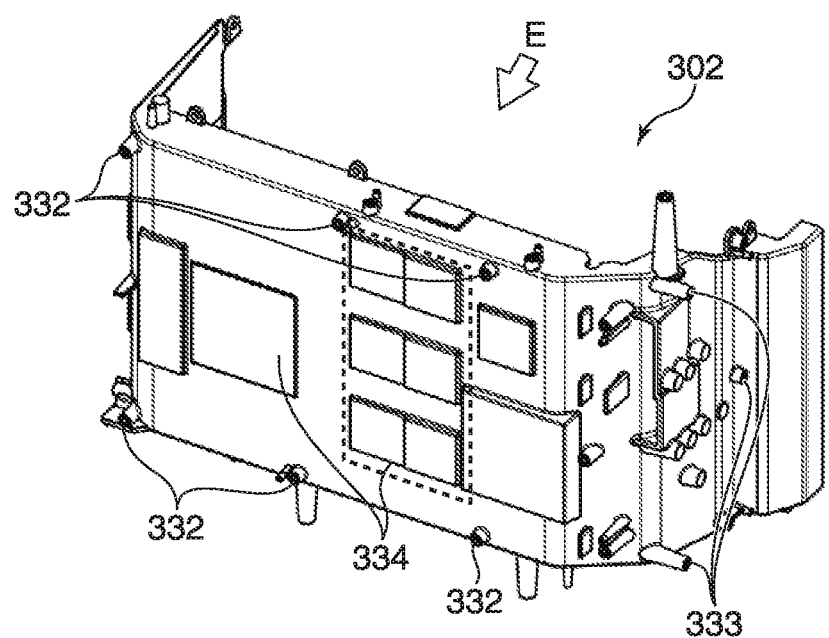
FIG. 21A is a perspective view of a right duct viewed from the back side of the camera body.
Figure 21B:
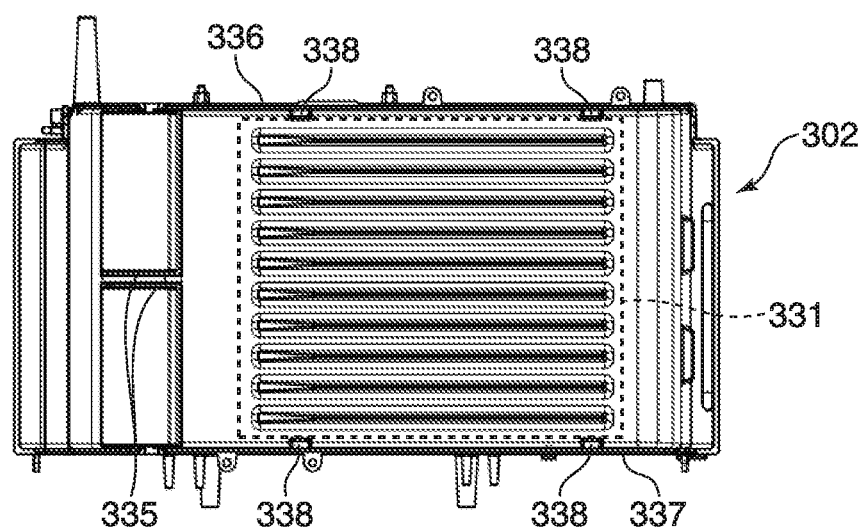
FIG. 21B is a view of the right duct shown in FIG. 21A, viewed in a direction of arrow E shown in FIG. 21A.

Next, referring to FIGS. 21A and 21B, the description of the right duct 302 will be given. FIG. 21A is a perspective view of the right duct 302 viewed from the back side of the camera body 100. FIG. 21B is a view of the right duct 302 shown in FIG. 21A, viewed in a direction of arrow E shown in FIG. 21A.

As shown in FIG. 21A, the right duct 302 has main board fixing parts 332 and power supply board fixing parts 333 for fixing the main board 400 and the power supply board 404 with, for example, screws, respectively. The right duct 302 is provided with right duct protruding parts 334 at positions corresponding to the front-end IC 600, the video processing ICs 602, and the memories 603 to be mounted on the main board 400, respectively. Sizes of the right duct protruding parts 334 are substantially the same as those of the heat radiation rubbers (not shown) to be stuck to the right duct protruding parts 334. Accordingly, the heat generated by the front-end IC 600, the video processing ICs 602, and the memories 603 can be transmitted to the right duct protruding parts 334 through the heat radiation rubbers.

As shown in FIG. 21B, the right duct 302 is provided with the right duct fins 331 and fan rubber holding ribs 335 for holding the fan rubber 306 including the fan 300 integrated, between a right duct upper wall 336 and a right duct lower wall 337 inside the right duct 302. The plurality of right duct fins 331 are arranged in a row at predetermined intervals in a height direction of the camera body 100, in order to enlarge a heat radiation area. Right duct ribs 338 are provided on the right duct upper wall 336 and the right duct lower wall 337 at each position of left and right ends of the right duct fins 331. An aim of the arrangement of the right duct ribs 338 will be described later.

Figure 22A:
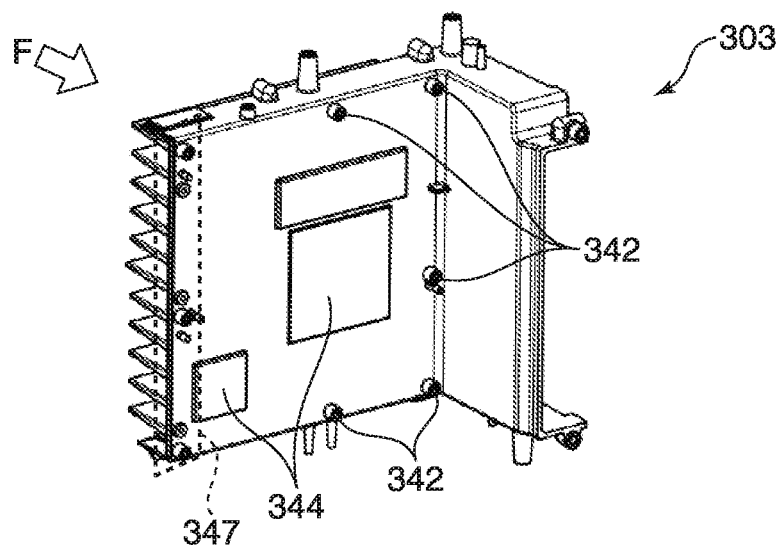
FIG. 22A is a perspective view of a left duct.
Figure 22B:
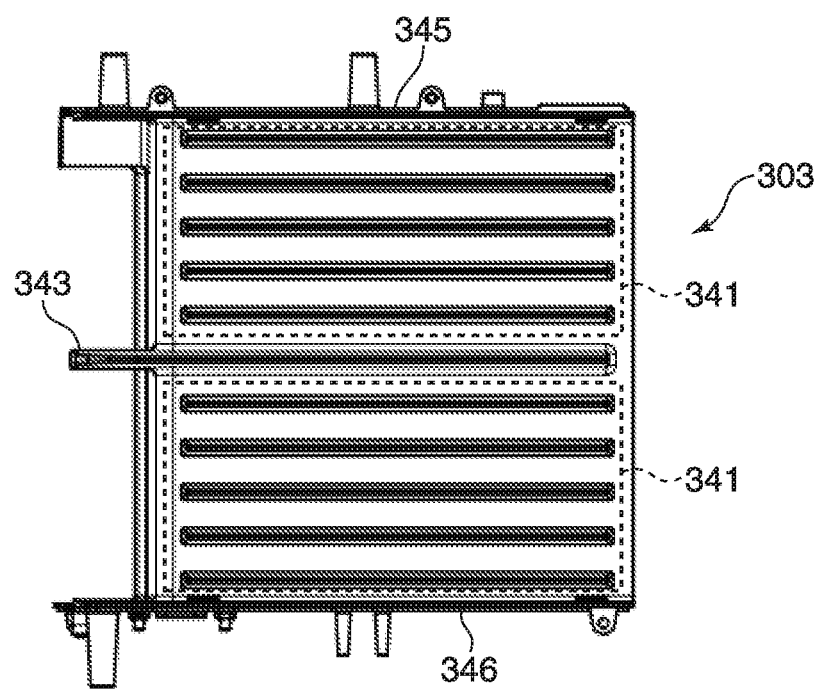
FIG. 22B is a view of the left duct shown in FIG. 22A, viewed in a direction of arrow F shown in FIG. 22A.

Next, referring to FIGS. 22A and 22B, the description of the left duct 303 will be given. FIG. 22A is a perspective view of the left duct 303. FIG. 22B is a view of the left duct 303 shown in FIG. 22A, viewed in a direction of arrow F shown in FIG. 22A.

As shown in FIG. 22A, the left duct 303 is provided with sub-board fixing parts 342 for fixing the sub-board 401 and the sub-board heat radiation plate 411 with, for example, screws. The left duct 303 is provided with left duct protruding parts 344 at positions corresponding to, for example, the back-end IC 611 and the format conversion IC 612 to be mounted on the sub-board 401, respectively. Sizes of the left duct protruding parts 344 are substantially the same as those of heat radiation rubbers to be stuck to the left duct protruding parts 344. Accordingly, the heat generated by the back-end IC 611 and the format conversion IC 612 can be transmitted to the left duct protruding parts 344 through the heat radiation rubbers. The left duct 303 is also provided with left duct fixing parts 347 for fixing the left duct rear 304.

As shown in FIG. 22B, the left duct 303 is provided with the plurality of left duct fins 341 arranged in a row at predetermined intervals in the height direction of the camera body 100, inside thereof, in order to enlarge a heat radiation area. A separation wall 343 is provided to a substantially center part of the inside of the left duct 303. The separation wall 343 separates an internal space into two in an upper and lower direction when the right duct 302 and the left duct 303 are combined. The right duct upper wall 336 and the right duct lower wall 337 of the right duct 302 are integrated with a left duct upper wall 345 and a left duct lower wall 346 of the left duct 303, respectively, which eliminates a gap in the fan duct unit 301. Accordingly, it is possible to prevent, for example, dust and rainwater from entering.

Figure 23A:
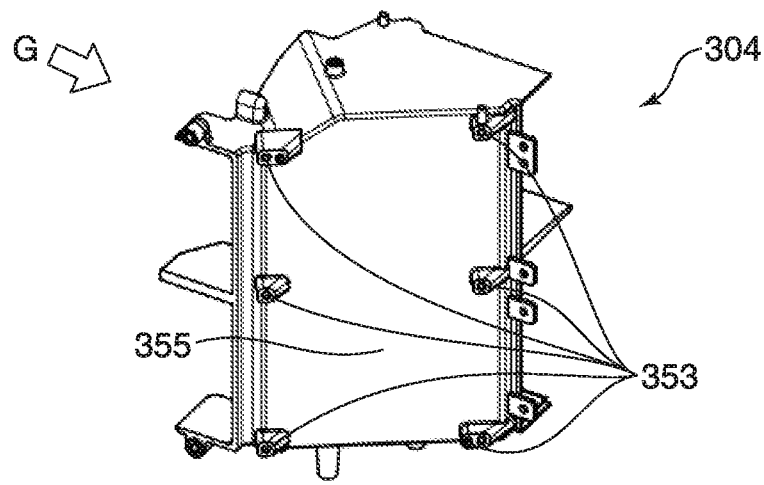
FIG. 23A is a perspective view of a left duct rear.
Figure 23B:
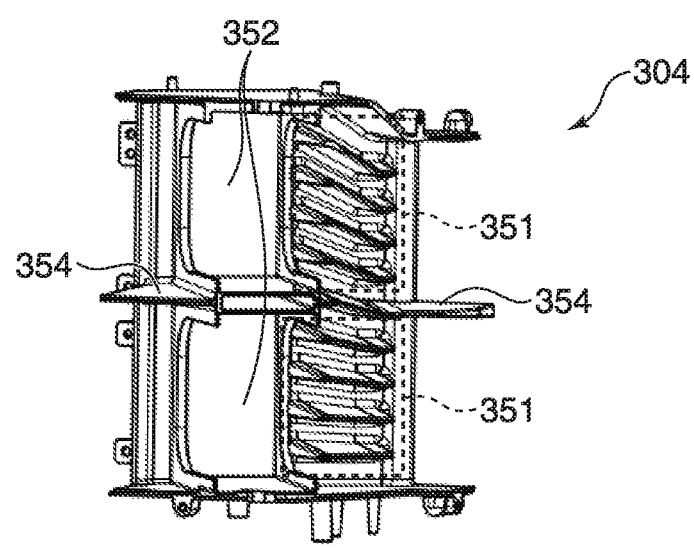
FIG. 23B is a perspective view of the left duct rear shown in FIG. 23A, viewed in a direction of arrow G shown in FIG. 23A.

Next, referring to FIGS. 23A and 23B, the description of the left duct rear 304 will be given. FIG. 23A is a perspective view of the left duct rear 304. FIG. 23B is a perspective view of the left duct rear 304 shown in FIG. 23A, viewed in a direction of arrow G shown in FIG. 23A.

As shown in FIG. 23A, the left duct rear 304 is provided with board fixing parts 353 for fixing the video compression circuit board 403 with, for example, screws. The left duct rear 304 is also provided with a heat radiation plane part 355 at a position corresponding to the video compression IC 631 to be mounted on the video compression circuit board 403. Heat generated by the video compression IC 631 can be transmitted to the heat radiation plane part 355 through a heat radiation rubber (not shown).

As shown in FIG. 23B, the left duct rear 304 is provided with a plurality of left duct rear fins 351 for enlarging a heat radiation area, and two fan integrating parts 352 for holding the fan rubber 306 including the fan 300 integrated, inside of the left duct rear 304. A separation wall 354 is provided at a substantially center part of the inside of the left duct rear 304. The separation wall 354 separates an internal space into two when the left duct rear 304 is integrated into the right duct 302. Accordingly, discharged air from one fan 300 out of the two fans 300 is prevented from being inhaled into the other fan 300, which make it possible to securely discharge air heated by the right duct fins 331 and the left duct fins 341 to the outside of the camera body 100.

Figure 24:
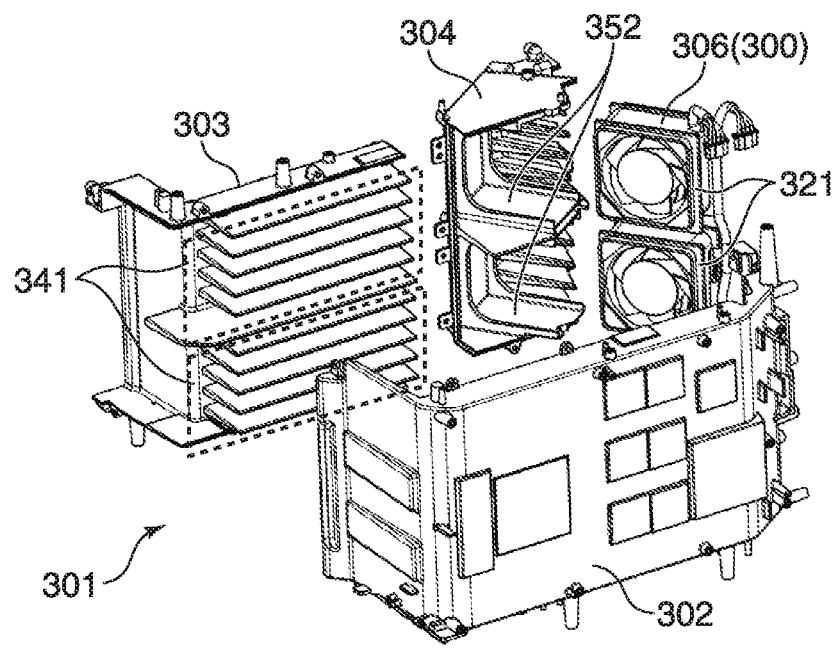
FIG. 24 is an exploded perspective view of the fan duct unit.

Next, referring to FIG. 24, the description of the fan duct unit 301 will be given. FIG. 24 is an exploded perspective view or the fan duct unit 301. As shown in FIG. 24, the fan rubbers 306 are integrated into the fan integrating parts 352 of the left duct rear 304 in a state where the outer ribs 321 are abutted on, to hold the fans 300. With this type of configuration, there is an effect that vibration generated by rotation of the blades 313 of the fans 300 is prevented from influencing the camera body 100. Since the outer ribs 321 also abut on the right duct 302, there is an effect that a backflow of the air is prevented from occurring in the fan duct unit 301.

Figure 25:
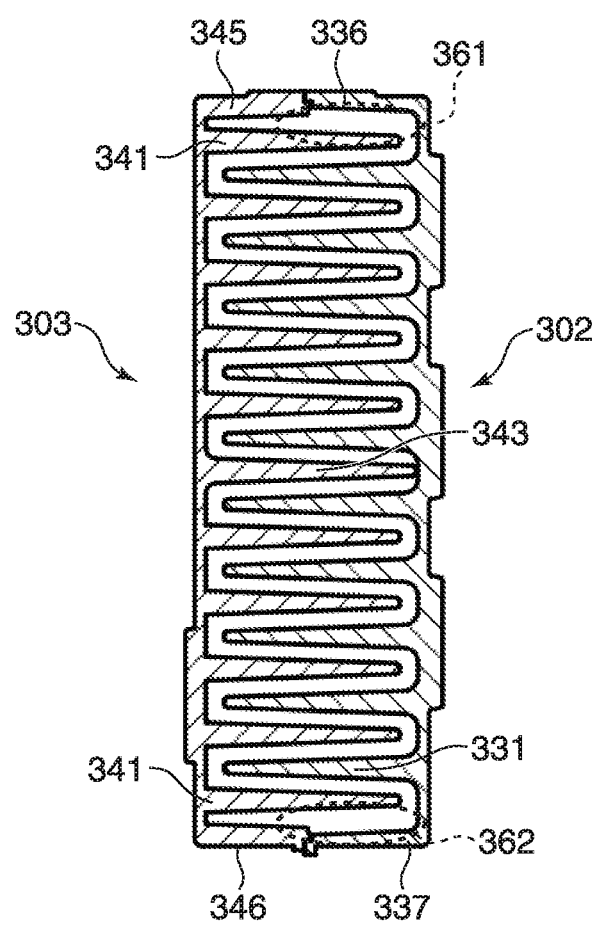
FIG. 25 is a sectional view taken along line A-A of FIG. 17A.
Figure 26:
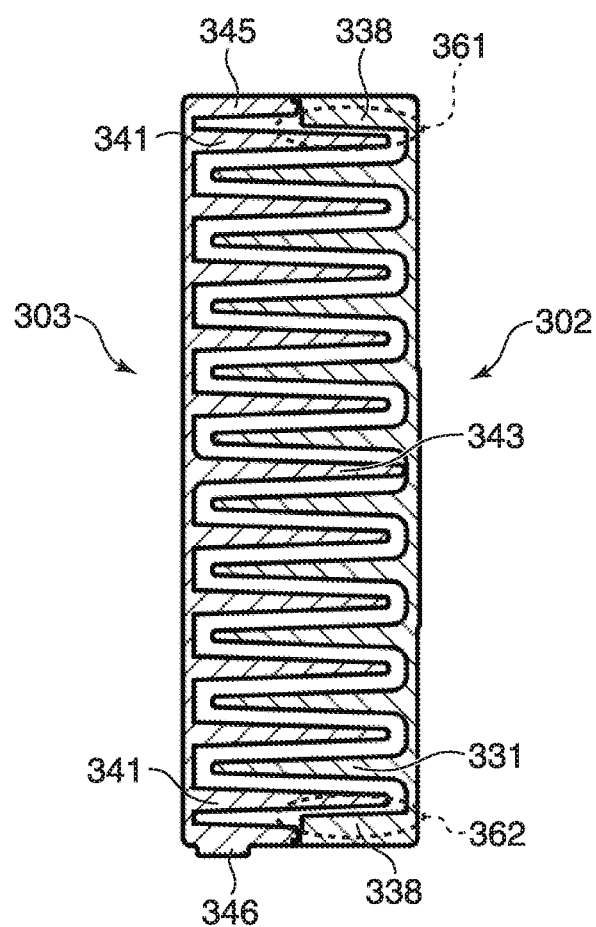
FIG. 26 is a sectional view taken along line B-B of FIG. 17A.

FIG. 25 is a sectional view taken along line A-A of FIG. 17A. FIG. 26 is a sectional view taken along line B-B of FIG. 17A. It should be noted that FIG. 26 is a sectional view at a position of the right duct ribs 338 of the right duct 302 shown in FIG. 21B.

As shown in FIG. 25, in the fan duct unit 301, each of the left duct fins 341 of the left duct 303 is inserted between the right duct fins 331 of the right duct 302, adjacent to each other in the height direction of the camera body 100 (in an upper and lower direction in the figure). That is, the plurality of right duct fins 331 and the plurality of left duct fins 341 are alternately arranged in the height direction of the camera body 100. Accordingly, the air inhaled by the fans 300 passes through gaps between the right duct fins 331 and the left duct fins 341, which make it possible to perform cooling on the right duct 302 and the left duct 303.

A duct upper space 361 is formed between the right duct upper wall 336 of the right duct 302 and an uppermost left duct fin 341 of the left duct 303. A duct lower space 362 is formed between the right duct lower wall 337 of the right duct 302 and a lowermost left duct fin 341 of the left duct 303. Both of the duct upper space 361 and the duct lower space 362 are larger than spaces between the right duct fins 331 and the left duct fins 341.

Here, according to the present embodiment, as shown in FIG. 26, the volumes of the duct upper space 361 and the duct lower space 362 partially decrease by providing the right duct ribs 338 described above to the right duct 302. Accordingly, the air that flows through the duct upper space 361 and the duct lower space 362 is made to barely flow, to increase the speed of a flow of the air at a center part of the fan duct unit 301, which makes it possible to improve a heat radiation effect due to the fins 331 and 341.

As described above, according to the present embodiment, for example, the card board unit 261 requiring plenty of space in the width direction of the camera body 100, can be arranged in the space 307 at the inner part of the substantially C shape of the fan duct unit 301. Accordingly, the camera body 100 in the width direction can be reduced in thickness, which makes it possible to miniaturize the camera body 100.

According to the present embodiment, the main board 400 having a relatively large area can be arranged on the outside of the cooling part 326 of the substantially C-shaped fan duct unit 301, and the sub-board 401 having a relatively small area can be arranged on the inside of the cooling part 326. Accordingly, the cooling part 326 can cool heat generated by the heat-producing elements mounted on the respective boards 400 and 401, with the heat exchange, which makes it possible to improve heat radiation efficiency.

It should be noted that the configuration according to the present invention is not limited to the exemplification according to the above mentioned embodiment; accordingly, materials, shapes, dimensions, forms, numbers, arrangement positions, etc. can be appropriately made as long as they are within the scope of the gist of the present invention.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2015-254085, filed Dec. 25, 2015 which is hereby incorporated by reference wherein in its entirety.

What is claimed is:

1. An image pickup apparatus comprising:
   an image pickup element configured to photoelectrically convert an object image formed, by a shooting optical system;
   a first circuit board arranged along in an optical axial direction of the image pickup element;
   a second circuit board arranged along the optical axial direction in parallel with the first circuit board;
   a fan;
   an inlet arranged on one side of an apparatus body of the image pickup apparatus in a width direction, said inlet being configured to inhale external air by drive of said fan;
   an outlet arranged on the one side of the apparatus body in the width direction, the outlet being configured to discharge the air inhaled through said inlet by the drive of said fan; and
   a duct provided inside of the apparatus body while extending along in the optical axial direction, said duct having an inhaling part interconnecting with said inlet, a discharging part interconnecting with said outlet, and a cooling part connected to each of the inhaling part and the discharging part,
   wherein each of the inhaling part and the discharging part is connected to the cooling part in a direction intersecting with the cooling part,
   wherein the first circuit board is arranged on a surface of a side of the cooling part, on which said inlet and said outlet are open, and the second circuit board is arranged on a surface of a side of the cooling part, opposite to the surface on which the first circuit board is arranged.

2. The image pickup apparatus according to clam 1, wherein the inhaling part of said duct is connected to the cooling part while intersecting at a substantially right angle against the cooling part.

3. The image pickup apparatus according to claim 1, wherein the discharging part of said duct is connected to the cooling part while intersecting at an obtuse angle against the cooling part.

4. The image pickup apparatus according to claim 3, wherein said fan is provided at a connection part of the discharging part of said duct and the cooling part.

5. The image pickup apparatus according to claim 1, said inlet is arranged on a front side of the apparatus body, which is an object side of the apparatus body, and said outlet is arranged on a back side of the apparatus body.

6. The image pickup apparatus according to claim 1, wherein
   the second circuit board is larger than the first circuit board in area.

7. The image pickup apparatus according to claim 1, wherein each of the inhaling part, the discharging part, and the cooling part includes a cooling fin formed therein.

8. The image pickup apparatus according to claim 1, wherein two fans are arranged in a row, each arranged perpendicular to a direction of an airflow of air flowing through the cooling part.

* * * * *